July 14, 1942.　　　　E. J. MARTIN　　　　2,289,793
ART OF REFINING
Filed May 13, 1940
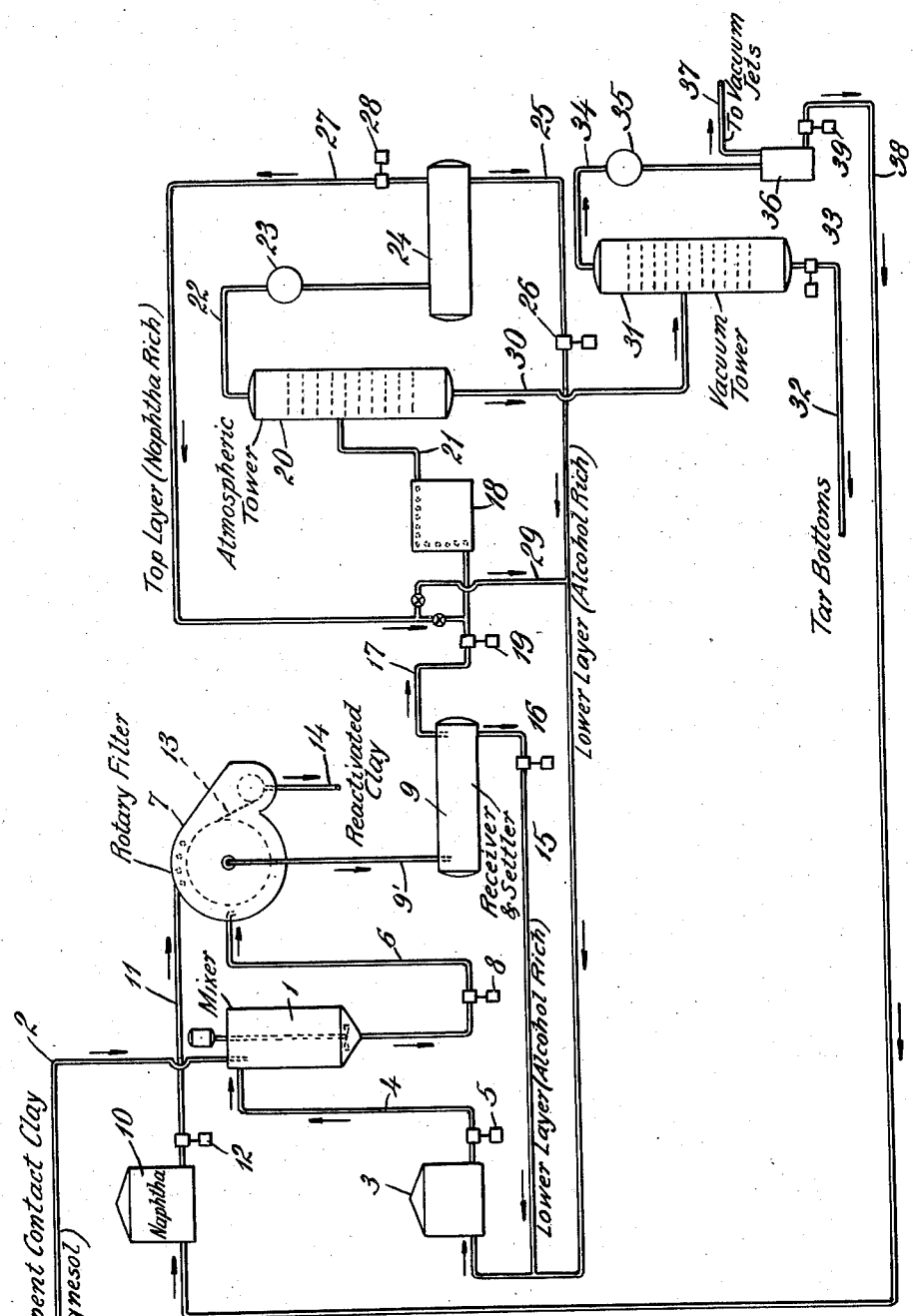
INVENTOR
Edward J. Martin
BY
Pennie, Davis, Marvin & Edmonds
ATTORNEYS Patented July 14, 1942

2,289,793

UNITED STATES PATENT OFFICE 2,289,793

ART OF REFINING

Edward J. Martin, East Chicago, Ind., assignor to Sinclair Refining Company, New York, N. Y., a corporation of Maine Application May 13, 1940, Serial No. 334,907

6 Claims. (Cl. 202—56)

This invention relates broadly to the treatment of mineral oil to remove contaminating coloring matter therefrom and more particularly to an economic treatment of the blend of naphtha and color solvent used in the reactivation of decolorizing earth for recovery of the color solvent and naphtha.

In the treatment of mineral oil with decolorizing earth, contaminating coloring matter is removed from the oil and adsorbed by the earth. After separation of the treated oil and earth, the earth is usually washed with naphtha to remove substantially all of the oil and the deoiled earth may be then treated with a blend of naphtha and a color solvent to remove adsorbed coloring matter from the earth and reactivate it for further use.

Various color solvents have been proposed for use in reactivating spent clays used in the treatment of mineral oil. Among the solvents which have been used are ethyl alcohol and methyl ethyl ketone. Many of these solvents as sold commercially are not completely miscible with naphtha. If the blend of solvent and naphtha is permitted to stand, it will separate into two liquid phases and the tars and other coloring matter removed from the treated earth are retained in the upper layer which is rich in naphtha. I therefore propose to separate the color solvent blend, by decanting, to obtain a lower layer rich in alcohol or other color solvent and substantially free from tar or other coloring matter which can be employed in the make-up of additional solvent blend. The upper layer, which is rich in naphtha and contains the contaminating coloring matter from the earth, may be distilled to recover additional alcohol and naphtha and to separate the contaminating coloring matter from the alcohol and naphtha.

In carrying out my invention using commercial ethyl alcohol as the color solvent a slurry of deoiled decolorizing earth and a blend of substantially one part of ethyl alcohol and three parts of naphtha is prepared and the blend separated from the earth in a filter to remove the contaminating coloring matter that has been adsorbed from the oil by the earth. The filter cake is then washed with naphtha to remove any remaining traces of color solvent and is ready for reuse. The color solvent-naphtha blend and the naphtha used in washing the earth is collected in a tank and permitted to separate into two liquid phases. The lower layer which is rich in alcohol and substantially free from contaminating coloring matter may then be withdrawn and employed in the make-up of additional color solvent-naphtha blend and the upper layer treated by distillation to separate the contaminating coloring matter and to recover additional color solvent and naphtha.

In the treatment of mineral oils with decolorizing earth a final naphtha wash is necessary for economic operation to recover the small amount of color solvent that is entrained in the reactivated clay. The filtrate so obtained therefore contains a small amount of color solvent and a considerable quantity of naphtha. A solvent recovery unit must therefore be operated to yield a product containing up to 50 percent alcohol to permit the recovered material to be employed in preparation of fresh naphtha-color solvent blend containing three parts of naphtha and one part of color solvent. Due to the formation of constant boiling mixtures below this concentration a single pass through a distillation unit will not yield the desired alcohol-rich cut. In carrying out my invention I therefore find it desirable to cool the distillate to a temperature of approximately 90° F. and collect the condensate so formed in a tank, to permit further phase separation. The resultant alcohol rich lower layer is then used with the alcohol rich lower layer separated in the first phase separation prior to distillation in the preparation of additional color solvent-naphtha blend and the naphtha rich upper layer is returned to the still for distillation.

In the accompanying drawing I have shown a diagrammatic view of apparatus illustrating the process of the present invention.

In the removal of contaminating coloring matter from mineral oil the oil may first be blended with a solvent to reduce it to a viscosity at which it can be readily handled and is then mixed with a decolorizing earth. Many decolorizing earths may be employed for this purpose. As examples of decolorizing earths now used I may mention finely divided fuller's earth, activated bauxites, such as "Porocel," and acid treated bentonites, such as "Fitrol" or "Tonsil." The synthetic adsorbent decolorizing earth known as "Magnesol" which is a hydrated magnesium silicate, may also be employed. It is understood that the term "decolorizing earth" as used in the description and claims of the present invention refers to any of the naturally occurring or artificially prepared decolorizing materials known to the art and used in bleaching mineral oils. The oil and naphtha blend is brought into contact with the decolorizing earth, such as Magnesol, employing from 6 to 12 percent of the decolorizing earth on a dry basis by weight of oil, at temperatures of 150° F. to 600° F. and maintained in contact with the decolorizing earth until substantially all of the contaminating coloring matter is removed from the oil. The naphtha can then be removed by distillation from the mixture of oil and earth and the decolorized oil separated from the decolorizing earth in any suitable manner, as by filtering, and the filter cake washed with naphtha to remove entrained oil therefrom. The deoiled decolorizing earth is then ready for treatment with a color solvent for reactivation.

This deoiled decolorizing earth is delivered to a mixing tank 1 through a suitable conveying apparatus 2 and a slurry is formed by mixing it with a blend of naphtha and color solvent. In a specific example of the process I employ a blend consisting of 1 part of commercial ethyl alcohol and 3 parts of 200–300 naphtha. This blend is contained in a tank 3 and is delivered to the mixing tank through pipe 4 by means of a pump 5. The mixing tank may be provided with suitable heating means (not shown) whereby the slurry of decolorizing earth and color solvent-naphtha blend is heated to a temperature of about 130° F. The slurry is then delivered through a pipe 6 to a vacuum filter 7 by means of a pump 8 and the color solvent-naphtha blend together with the tars and other containinating coloring matter is separated from the decolorizing earth and delivered through a pipe 9' to a tank or receiver 9. The decolorizing earth is then given a final naphtha wash to remove any entrained color solvent, the naphtha being delivered from a tank 10, through pipe 11 to the filter 7, a pump 12 being provided in the line for this purpose. In practice I employ about .8 gal. of naphtha per pound of clay in the final naphtha wash. The filtrate consisting of a small amount of alcohol and a considerable quantity of naphtha is also delivered through pipe 9' to tank or receiver 9. The filter cake is removed from the filter by a scraper blade 13 and delivered by suitable conveying means 14 for reuse in the treatment of oil.

The color solvent-naphtha blend containing tars and other contaminating coloring matter is then allowed to stand in the tank 9 until phase separation occurs and a lower layer which is substantially free of contaminating coloring matter is withdrawn from the tank 9 through pipe 15 and returned to the tank 3 for use in make-up of additional color solvent-naphtha blend. A pump 16 is arranged in the line 15 for this purpose. This bottom layer which comprises 8 to 10 percent of the total quantity contains about three parts of color solvent to one part of naphtha. The upper layer, which is rich in naphtha and which contains substantially all of the contaminating coloring matter removed from the decolorizing earth, is withdrawn from the tank 9 through pipe 17 and delivered to a pipe still 18. A suitable pump 19 is arranged in the line 17. The vapors produced in the still 18 are delivered to an atmospheric fractionating tower 20 through pipe 21. The vapors from tower 20 pass out at the top through pipe 22 through a heat exchanger 23 where they are cooled to a temperature of substantially 90° F. causing them to condense and are then collected in a tank 24.

The condensate collected in tank 24 is also permitted to stand until a phase separation occurs and the lower layer consisting of about three parts of color solvent and one part of naphtha is withdrawn through pipe 25 by a pump 26 and returned to the tank 3. The top layer produced in this phase separation which consists of over 90 percent naphtha is withdrawn through pipe 27 by means of a pump 28. As shown, this pipe is connected to pipe 17 leading to the still 18 and is also provided with a branch 29 connected to the pipe 25. This permits recycling of all or part of the naphtha rich upper layer. As stated, it is necessary to recover a product containing up to 50 percent color solvent from the solvent recovery unit in order to balance out in the preparation of color solvent-naphtha make-up containing three parts of naphtha to one part of color solvent. By controlling the proportion of the naphtha rich upper layer which is recycled from tank 24, the proportion of alcohol or other color solvent recovered may be controlled to yield the proper proportion of alcohol in the liquid returned to the tank 3.

The bottoms from atmospheric tower 20, containing substantially all of the tars and other contaminating coloring matter is delivered through pipe 30 to a vacuum tower 31 and the tar bottoms are removed from the bottom of this tower through a pipe 32 by pump 33. The vapors from the vacuum tower pass through pipe 34 to a cooling device 35 and the condensate is collected in a tank 36. Uncondensed gases and vapors exit from this tank through pipe 37 and the condensate which is substantially all naphtha is removed from the tank through a pipe 38. A pump 39 is arranged in this pipe and the other end of the pipe is connected to tank 10 in which the naphtha is stored for the final naphtha wash in the filter 7.

While the process has been described particularly with respect to the use of commercial ethyl alcohol, it may be employed in connection with any of the well-known color solvents used in treating decolorizing earth which are partially miscible with naphtha in blends of substantially three parts of naphtha to one part of color solvent. The invention may thus be applied to blends of naphtha and ketones containing more than 5 percent of water and to blends of naphtha and methyl alcohol. The phase separation of the filtrate in tank 9 permits a recovery of from 8 to 10 percent of the liquid used in the reactivating of the decolorizing earth and the final wash of the decolorizing earth which is substantially free from contaminating coloring matter and which contains about three parts of alcohol and one part of naphtha. The phase separation in tank 24 together with recycling of part or all of the upper layer removed from this tank permits control of the amount of alcohol, or other color solvent, return to the tank 3 to give the proper proportions of alcohol and naphtha in the blend used for preparing the color solvent-naphtha blend and additional naphtha recovered from the vacuum tower 31 is reused as the final naphtha wash.

I claim:

1. The herein described process which comprises collecting a blend of naphtha and a material from the group consisting of ketones and ethyl alcohol used in reactivation of decolorizing earth containing contaminating coloring matter and the contaminating coloring matter removed from the earth, permitting the collected liquid to settle into a lower layer rich in the material from the group consisting of ketones and ethyl alcohol and substantially free from contaminating coloring matter and an upper layer rich in naphtha and containing substantially all the contaminating coloring matter removed from the earth, withdrawing the lower layer, and treating the upper layer to separate the contaminating coloring matter therefrom and to recover additional naphtha and material from the group consisting of ketones and ethyl alcohol.

2. The herein described process which comprises collecting a blend of naphtha and a material from the group consisting of ketones and ethyl alcohol used in reactivation of decolorizing earth containing contaminating coloring matter and the contaminating coloring matter removed from the earth, permitting the collected liquid to settle into a lower layer rich in the material from the group consisting of ketones and ethyl alcohol and substantially free from contaminating coloring matter and an upper layer rich in naphtha and containing substantially all the contaminating coloring matter removed from the earth, withdrawing the lower layer and distilling the upper layer to separate the contaminating coloring matter from the naphtha and material from the group consisting of ketones and ethyl alcohol.

3. The herein described process which comprises collecting a blend of naphtha and a material from the group consisting of ketones and ethyl alcohol used in reactivation of decolorizing earth containing contaminating coloring matter and the contaminating coloring matter removed from the earth, permitting the collected liquid to settle into a lower layer rich in the material from the group consisting of ketones and ethyl alcohol and substantially free from contaminating coloring matter and an upper layer rich in naphtha and containing substantially all the contaminating coloring matter removed from the earth, withdrawing the lower layer, distilling the upper layer and fractionating the vapors to separate a portion of the naphtha and the contaminating coloring matter as liquid and the remainder of the naphtha and material from the group consisting of ketones and ethyl alcohol as vapor, cooling the vapors to condense them, collecting the condensate, permitting it to settle into a lower layer rich in material from the group consisting of ketones and ethyl alcohol and an upper layer rich in naphtha, and separating the layers.

4. The herein described process which comprises collecting a blend of naphtha and methyl ethyl ketone used in reactivation of decolorizing earth containing contaminating coloring matter and the contaminating coloring matter removed from the earth, permitting it to settle in a lower layer rich in methyl ethyl ketone and substantially free from contaminating coloring matter and an upper layer rich in naphtha and containing substantially all the contaminating coloring matter removed from the decolorizing earth, withdrawing the lower layer, and treating the upper layer to separate the contaminating coloring matter therefrom and to recover additional naphtha and methyl ethyl ketone.

5. The herein described process which comprises collecting a blend of naphtha and methyl ethyl ketone used in reactivation of decolorizing earth containing contaminating coloring matter and the contaminating coloring matter removed from the earth, permitting it to settle in a lower layer rich in methyl ethyl ketone and substantially free from contaminating coloring matter and an upper layer rich in naphtha and containing substantially all the contaminating coloring matter removed from the decolorizing earth, withdrawing the lower layer, and distilling the upper layer to separate contaminating coloring matter from the naphtha and methyl ethyl ketone.

6. The herein described process which comprises collecting a blend of naphtha and methyl ethyl ketone used in reactivation of decolorizing earth containing contaminating coloring matter and the contaminating coloring matter removed from the earth, permitting it to settle in a lower layer rich in methyl ethyl ketone and substantially free from contaminating coloring matter and an upper layer rich in naphtha and containing substantially all the contaminating coloring matter removed from the decolorizing earth, withdrawing the lower layer, distilling the upper layer, fractionating the distillate to separate a portion of naphtha and contaminating coloring matter as liquid and the remaining naphtha and methyl ethyl ketone as vapor, cooling the vapors to condense them, collecting the condensate, and permitting it to settle into a lower layer rich in methyl ethyl ketone and an upper layer rich in naphtha.

EDWARD J. MARTIN.